United States Patent [19]

Novotny et al.

[11] Patent Number: 5,215,325

[45] Date of Patent: Jun. 1, 1993

[54] SELF-STORING TOW LINE

[75] Inventors: Roger W. Novotny, Troy; Theodore G. Porter, Linden; Robert G. Storc, Rochester Hills; R. Donald Hollinger, Richmond, all of Mich.

[73] Assignee: General Motors Corporation, Detroit, Mich.

[21] Appl. No.: 740,783

[22] Filed: Aug. 6, 1991

[51] Int. Cl.$^5$ .............................................. B60D 1/18
[52] U.S. Cl. .................................. 280/480.1; 293/117
[58] Field of Search ............... 280/400, 480, 480.1; 180/7.5; 293/102, 106, 116, 117, 124

[56] References Cited

U.S. PATENT DOCUMENTS

| | | | |
|---|---|---|---|
| 2,194,623 | 3/1940 | Thompson | 280/480.1 |
| 3,740,079 | 6/1973 | Skinner | 280/480 |
| 3,881,751 | 5/1975 | Colby | 280/480 |
| 4,818,006 | 4/1989 | Arndt | 296/32 |
| 4,950,010 | 8/1990 | Denny | 293/117 |

FOREIGN PATENT DOCUMENTS 0356089  2/1990  European Pat. Off. ............ 280/480

Primary Examiner—Robert J. Oberleitner
Assistant Examiner—Victor E. Johnson
Attorney, Agent, or Firm—Edward J. Biskup

[57] ABSTRACT

A tow line arrangement for a motor vehicle that includes a pair of self-storing tow lines located behind the bumper and characterized in that each of the tow lines has a handle connected through a ring at the free end of the tow line so that the rings of the two tow lines can be combined at the longitudinal center line of the vehicle and thereby allow a straight-ahead tow by another vehicle.

1 Claim, 1 Drawing Sheet

SELF-STORING TOW LINE

FIELD OF THE INVENTION

This invention relates to motor vehicle accessories and more particularly to a self-storing tow line arrangement for a motor vehicle that enables the vehicle to be pulled out a ditch or the like or to be towed to a repair facility if the vehicle is disabled.

BACKGROUND OF THE INVENTION

It is quite common for 4-wheel drive vehicles that are frequently involved in off-highway usage to have one or more tow hooks secured to the vehicle frame behind the bumper. The tow hooks serve to provide an attaching means to which tow straps or tow cables can be secured in the event that the vehicle is disabled or finds itself in soil conditions from which it cannot extricate itself.

SUMMARY OF THE INVENTION

It is the intention of the present invention to eliminate the use of the above-described tow hooks and instead have the vehicle provided with a pair of self-storing tow lines which are carried by the vehicle frame and can be manually pulled out of the frame when needed. In this regard and in the preferred form of the present invention, the self-storing tow lines are incorporated in a motor vehicle having a bumper connected to and supported by a pair of laterally spaced frame members. A flexible tow line is carried by each of the frame members, and fastening means are provided for securing one end of the tow line to the associated frame member. An opening is formed in the bumper so that the free end of the tow line extends through the opening and is connected by a loop or ring to a handle. The handle is shaped so as to extend into and close the opening and be accessible for manual removal from the exterior of the bumper. In addition, retractor means are provided that are supported by the frame and are operatively connected to the tow line for normally storing a predetermined length of the tow line interiorly of the bumper. The retractor provides a continuous inwardly directed force on the tow line and serves to maintain the handle within the associated opening in the bumper when the tow line is not being used. The arrangement is such that when the handle of the tow line of each of the frame members is grasped and pulled outwardly relative to the bumper against the retracting force of the retractor, the predetermined length of the tow line is withdrawn from the bumper and allows the ring of one tow line to be combined with the ring of the other tow line for connection to a pull hook.

The objects of the present invention are to provide a new and improved tow line arrangement for a motor vehicle that includes a pair of separate tow lines stored within a pair of frame members located behind the vehicle bumper and combined with retractor means which serves to store a predetermined length of the tow line within the associated frame member and allow a predetermined length of the tow line to be withdrawn from the accommodating frame for connection with a pull hook; to provide a new and improved tow line arrangement for a motor vehicle that includes a pair of self-storing tow lines located behind the bumper and characterized in that each of the tow lines has a handle connected through a loop at the free end of the tow line so that the loops of the two tow lines can be combined at the longitudinal center line of the vehicle and thereby allow a straight-ahead tow; and to provide a new and improved tow line arrangement for a motor vehicle that has a pair of tow lines each having a predetermined length and each being normally stored within and fastened to a box section frame member and adapted to be withdrawn from the frame member by grasping a handle located in the vehicle bumper.

A retractable strap arrangement that has some similarities to the subject invention but differs structurally therefrom and also in its usage can be seen in U.S. Pat. No. 4,818,006, issued on Apr. 4, 1989 in the name of Gustav E. Arndt, and entitled "Pickup Bed Protector".

Other objects and advantages of the present invention will be apparent from the following detailed description of the invention when taken with the drawings in which:

DESCRIPTION OF THE PREFERRED EMBODIMENTS

Figure 1:
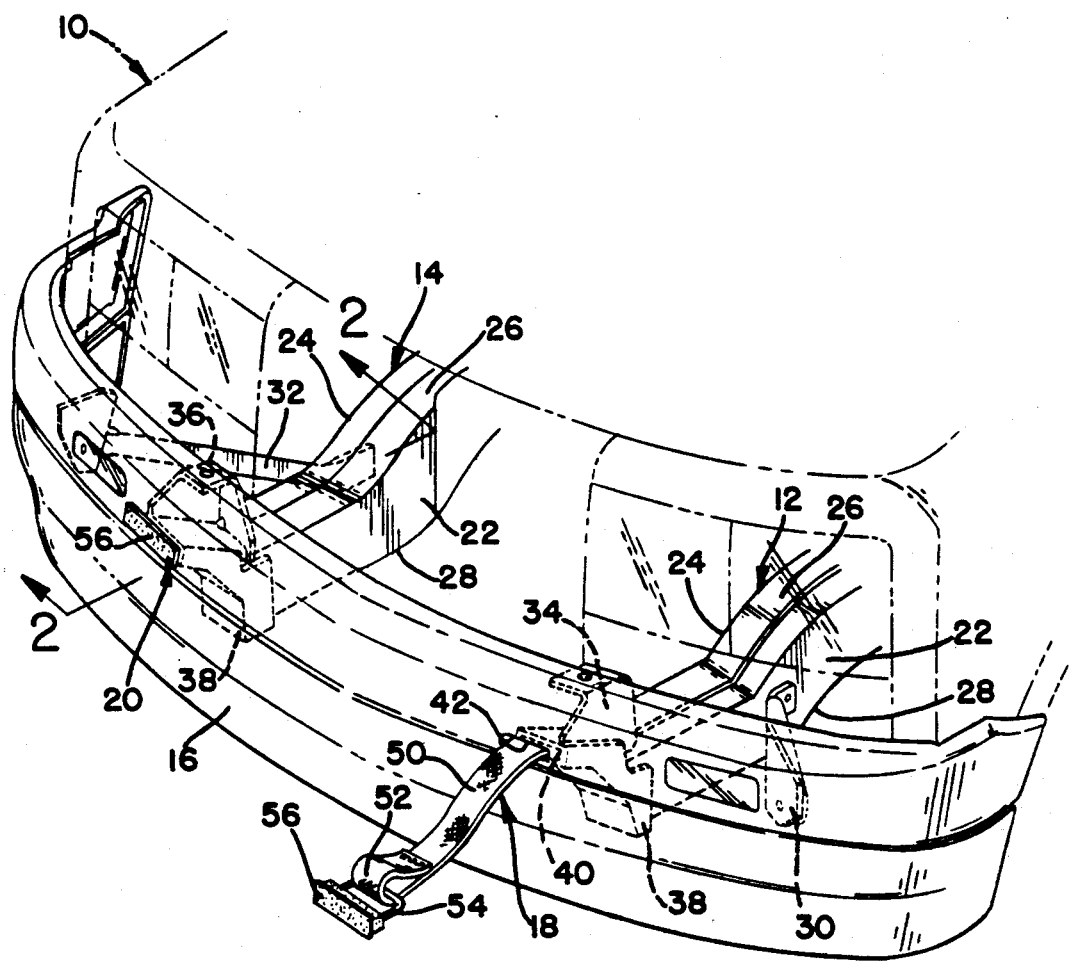
FIG. 1 is a perspective view of the front end of a motor vehicle incorporating a self-storing tow line arrangement made in accordance with the present invention.
Figure 2:
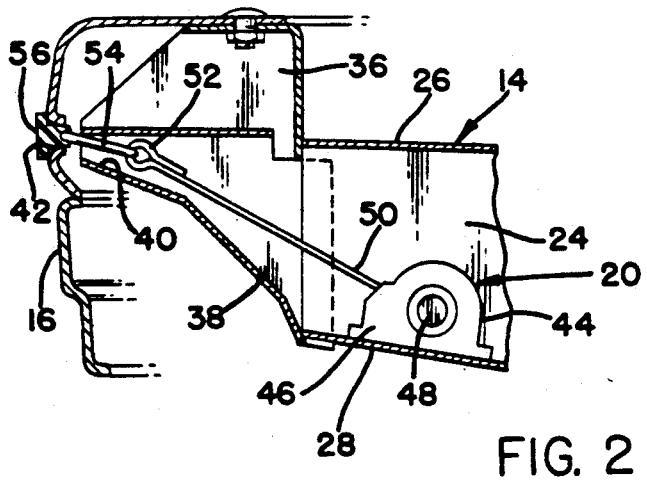
FIG. 2 is an enlarged cross sectional view taken on line 2—2 of one of the longitudinal frame members of the motor vehicle supporting one of the tow lines in accordance with the present invention.

Referring now to the drawings and more particularly FIGS. 1 and 2 thereof, a partial front end of a motor vehicle 10 is shown which includes a pair of laterally spaced and longitudinally extending frame members 12 and 14 supporting a bumper 16 and respectively incorporating a pair of identical tow line devices 18 and 20 which together provide a tow line arrangement made in accordance with the present invention.

Each of the frame members 12 and 14 is tubular or box shaped in cross section and comprises a pair of side walls 22 and 24, a top wall 26 and a bottom wall 28. The frame members 12 and 14 connect with and serve to support the transversely extending bumper 16 through a pair of side brackets 30 and 32 and a pair of top brackets 34 and 36. In addition, each frame member 12 and 14 has its front portion provided with a guide member 38 located adjacent the bumper 16 and provided with a spout type opening 40 which is located to the rear of and in axial alignment with a rectangular slot 42 formed in the bumper 16.

As best seen in FIG. 2, the tow line device 18–20 in each frame member 12 and 14 includes a retractor member 44 located within the confines of the associated frame member. In other words, the retractor member 44 is located between the side walls 22 and 24 of the associated frame and includes a housing 46 which is secured to the bottom wall 28. The retractor member 44 is intended to be similar in construction to a seat belt retractor and is provided with a rotatable shaft 48 supported by the housing 46 and fixedly connected to the inner end of a tow strap 50. As is conventional with retractors of this type, a predetermined length of the strap 50 is wound about the shaft 48 and is normally stored within the housing 46 and has a spring device (not shown) operatively connected to the shaft 48. In this case, the free end of the strap 50 associated with each retractor member 44 is formed as a loop 52 and connects with ring 54 which is generally shaped as a rectangle with one section thereof having a handle 56 molded thereabout.

Thus, from the above description, it should be apparent that when the tow line devices 18 and 20 in the frame members 12 and 14 are in the normal retracted condition, the handle 56 in each case is located in the associated slot 42 formed in the bumper 16. The ring 54 connected to the free end of the strap 50 is located in the spout type opening 40 of the guide member 38 and the predetermined length of the strap 50 is wound about the shaft 48 of the retractor member 18-20. If it is desired to have the vehicle towed, both of the handles 56 are simply grasped by the vehicle operator and pulled outwardly relative to the bumper 16 so as to cause the predetermined length of the strap 50 to be removed from each of the retractor members 44. Inasmuch as the predetermined stored lengths of the strap 50 are equal in length, the two ring members 54 can then be joined together at the longitudinal center axis of the vehicle 10 and connected to a hook provided on the cable or the like of a wrecker vehicle which is to tow the vehicle 10. Afterwards, when the extended tow straps 50 have served their purpose, they will be retracted by the retractor devices 44 into the frame members 12 and 14 and each handle 56 will be located in its accommodating slot 42 in the bumper 16 as seen in FIG. 2.

It will be understood that the strap incorporated with each tow line device 18 and 20 should be made of a high tensile strength NYLON material. Also, rather than using a strap, a metal cable can be substituted for the strap and the cable could be connected to a power or manually operated winch located within the frame member. In this manner, the vehicle could extricate itself without assistance from another vehicle.

Various changes and modifications can be made in the above-described invention without departing from the spirit of the invention. Such changes and modifications are contemplated by the inventors and, accordingly, they do not wish to be limited except by the scope of the appended claims.

The embodiments of the invention in which an exclusive property or privilege is claimed are defined as follows:

1. In combination with a motor vehicle having a pair of laterally spaced frame members, a bumper having an exterior portion and an interior portion and being connected to and supported by said pair of laterally spaced frame members, a pair of flexible tow straps, one end of one of said pair of tow straps being located in one of said frame members and one end of the other of said pair of tow straps being located in the other of said frame members, said bumper having a pair of slots formed therein, one of said slots being axially aligned with one of said frame members and the other of said slots being axially aligned with the other of said frame members, the other end of the tow strap located in the frame member axially aligned with one of said pair of slots adapted to extend through said one of said pair of openings and the other end of the tow strap located in the frame member axially aligned with the other of said pair of slots adapted to extend through said other of said pair of slots, a pair of handles, one of said handles connected to the other end of one of said tow straps and the other of said handles connected to the other end of the other of said tow straps, each of said handles having a portion thereof shaped so as to generally correspond to the size and shape of the associated slot in the bumper and be insertable therein to thereby close the associated slot when the tow strap is fully retracted into the associated frame while at the same time being accessible for independent manual removal from the exterior portion of the bumper, retractor means carried by each of said pair of frame members and operatively connected to the one end of the associated tow strap, said pair of handles being spaced from each other a distance so as to allow each of the handles to be manually grasped and pulled outwardly relative to the bumper and to be combined with the other handle along the longitudinal center axis of the vehicle to provide a single point connection with a pull hook of a tow vehicle and thereby permit a straight-ahead tow by the tow vehicle, and a pair of guide members, one of said pair of guide members being connected to one of said frame members and the other of said guide members being connected to the other of said frame members, each of said guide members having a spout type opening corresponding in configuration to and registering with one of said slots in said bumper adjacent the interior portion of the bumper and serving to guide one of said pair of tow straps when the handle associated therewith is pulled outwardly relative to the bumper.

* * * * *